United States Patent [19]
Yonezawa

[11] Patent Number: 5,082,021
[45] Date of Patent: Jan. 21, 1992

[54] THREE WAY VALVE ASSEMBLY WITH PRESSURE COMPENSATING VALVE

[75] Inventor: Keitaro Yonezawa, Kobe, Japan

[73] Assignee: Kabushiki Kaisha KOSMEK, Kobe, Japan

[21] Appl. No.: 619,952

[22] Filed: Nov. 30, 1990

[30] Foreign Application Priority Data

Dec. 7, 1989 [JP] Japan .................................. 1-320109

[51] Int. Cl.$^5$ ............................................. F15B 13/04
[52] U.S. Cl. .................... 137/596.2; 91/451; 137/884
[58] Field of Search .............. 137/596.2, 884; 91/451

[56] References Cited

U.S. PATENT DOCUMENTS 3,513,876 5/1970 Tarbox ................................ 137/596
4,770,210 9/1988 Neff et al. .......................... 137/884

FOREIGN PATENT DOCUMENTS

59-68801 5/1984 Japan .

Primary Examiner—Gerald A. Michalsky
Attorney, Agent, or Firm—Foley & Lardner

[57] ABSTRACT

In a three way valve assembly with a pressure compensating valve, a three way valve (2) is adapted to selectively communicate a work port (A) to a pressure supply port (S) and to a pressure discharge port (T). A pressure compensating valve (3) is adapted to release a pressure abnormally raised at a very slow speed within the work port (A) to the pressure discharge port (T). A first housing (10) of the three way valve (2) is fixedly secured between left and right end plates (4) (5) by means of assembly bolts (6) (7). A second housing (57) of the pressure compensating valve (3) is fixedly secured to one end surface (10c) of upper, lower, front and back end surfaces of the first housing (10) by means of a fixing means (67).

6 Claims, 6 Drawing Sheets

THREE WAY VALVE ASSEMBLY WITH PRESSURE COMPENSATING VALVE

BACKGROUND OF THE INVENTION

1. Field of the Invention

The present invention relates to a three way valve assembly with a pressure compensating valve, and the pressure compensating valve serves to hold an oil pressure within an actuating oil chamber in a hydraulic apparatus at a predetermined pressure by releasing an abnormal pressure raised at a slow speed when the oil pressure within the actuating oil chamber is abnormally increased at the slow speed by a thermal expansion of the pressurized oil and so on.

2. Description of the Prior Art

As such a three way valve with a pressure compensating valve, has been known the one disclosed in the Japanese Utility Model Laid Open Publication No. 1984-68801 previously proposed by the inventor of the present invention.

Figure 9:
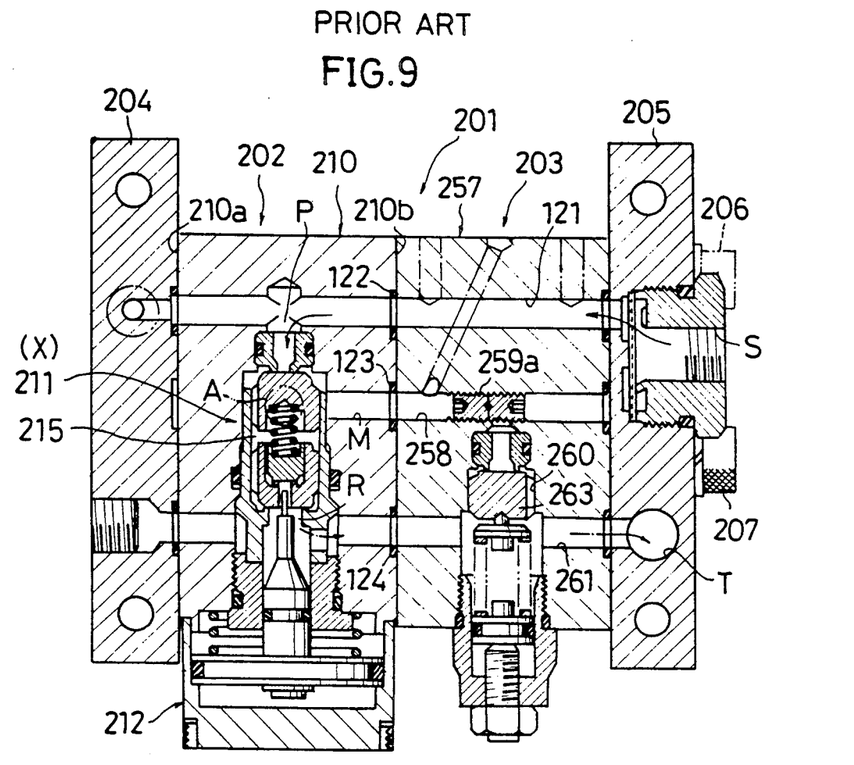
FIG. 9 is a vertical sectional front view of a three way valve assembly with a pressure compensating valve.

As shown in FIG. 9, a basic construction of the prior art is as follows.

A three way valve assembly 201 with a pressure compensating valve is provided with a three way valve 202, a pressure compensating valve 203, left and right paired end plates 204, 205 and assembly bolts 206, 207 having said three way valve 202 and said pressure compensating valve 203 located between the left and right end plates 204, 205 and having the left and right end plates 204, 205 tightened by means of said assembly bolts 206, 207 toward the central side from left and right sides.

The three way valve 202 is provided with a first housing 210, a directional changeover valve member 211 and a directional changeover manipulation means 212.

Within the first housing 210, a pressure port P, a work port A, a return port R and an abnormal pressure relief port M are communicated to a valve chamber 215, the directional changeover valve member 211 is inserted into the valve chamber 215, and the directional changeover valve member 211 is adapted to be manipulated by the directional changeover manipulation means 212 so as to be changed over to a pressure supply position X and to a pressure discharge position.

Under a pressure supply condition where the directional changeover valve member 211 is located at the pressure supply position X, the return port R is closed and a pressurized oil within the pressure port P is supplied to the work port A through the valve chamber 215, and to the contrary under a pressure discharge condition where the directional changeover valve member 211 is located at the pressure discharge position, the pressure port P is closed and a pressurized oil within the work port A is discharged to the return port R through the valve chamber 215.

The pressure port P and the return port R are opened in the left and the right end surfaces 210a, 210b of the first housing 210, and to the contrary, said work port A is opened in a portion of an upper, lower, front or back external surrounding surface of the first housing 210.

The pressure compensating valve 203 is constructed by communicating a pressure discharge outlet port 260 to a pressure inlet port 258 through a throttling passage 259a and a relief valve chamber 260 within a second housing 257, a relief valve member 263 is inserted into the relief valve chamber 260, the pressure inlet port 258 is communicated to the work port A of the three way valve 202, and the pressure discharge outlet port 261 is communicated to the return port R of the three way valve 2.

A pressure supply port S and a pressure discharge port T are opened in the end plates 204, 205, the pressure supply port S is communicated to the pressure port P of the three way valve 202, and the pressure discharge port T is communicated to the return port R of the three way valve 202.

In the above-mentioned basic construction, a construction for mounting the three way valve 202 and the pressure compensating valve 203 between both end plates 204, 205 is conventionally as follows.

That is, as shown in FIG. 9, the second housing 257 of the pressure compensating valve 203 is kept at its left end surface in contact with the right end surface 210b of the first housing 210 of the three way valve 202 so that both the valves 202, 203 are held and fixedly secured between the left and the right end plates 204, 205 by means of the assembly bolts 206, 207. Further, between the contact surfaces of both the housings 210, 257, the pressure port P of the three way valve 202 and the pressure supply inlet port 121 of the pressure compensating valve 203, the abnormal pressure relief port M and the pressure inlet port 258, and also the return port R and the pressure discharge outlet port 261 are oil-tightly intercommunicated through O-rings 122, 123, 124 respectively.

There are, however, the following problems associated with the above-mentioned prior art.

(a) An installation plane area for the three way valve assembly 201 is large.

Since the three way valve assembly 201 has the three way valve 202 and the pressure compensating valve 203 assembled left and right in a side by side arrangement, the length thereof in the left and right direction becomes large and the installation plane area is large.

(b) A flow characteristic of the three way valve 202 is low.

Since the pressure supply inlet port 121 is interposed in the second housing 257 of the pressure compensating valve 203 between the pressure supply port S and the pressure port P, a passage resistance on the pressure supply side of the three way valve 202 is large. In addition thereto, the pressure discharge outlet port 261 of the pressure compensating valve 203 is interposed between the pressure discharge port T and the return port R, the passage resistance on the pressure discharge side of the three way valve 202 is large. In that way, since the three way valve 202 is large in passage resistance both on the pressure supply side and on the pressure discharge side, the flow characteristic can't help becoming low.

(c) A necessary strength of the assembly bolts 206, 207 are large.

At the time of pressure supply of the three way valve 202, since an oil pressure acts also on the sealing surfaces of two O-rings 122, 123 between the contact surfaces of both the housings 210, 257 so as to separate both housings 210, 257 apart, the necessary strength of the assembly bolts 206, 207 become larger by the portion corresponding to an installation of the O-rings 122, 123.

(d) An oil leakage is apt to be caused between the contact surfaces of both the housings 210, 257.

Since the assembly bolts 206, 207 can't become long in length due to the passing through both the housings 210, 257, an elongation thereof gets large at the time of pressure supply. Therefore, the O-rings 122, 123 are squeezed out between both the housings 210, 257 and an oil leakage is apt to be caused there.

(e) It is troublesome to additionally assemble the pressure compensating valve 203.

In the case that the pressure compensating valve 203 is newly assembled to the already installed three way valve 202 for providing the three way valve assembly with the pressure compensating valve, since it is necessary to additionally bore bolt holes for the assembly bolts 206, 207 in the second housing 257 of the pressure compensating valve 203, it is troublesome to perform such additional work for the pressure compensating valve 203.

Figure 10:
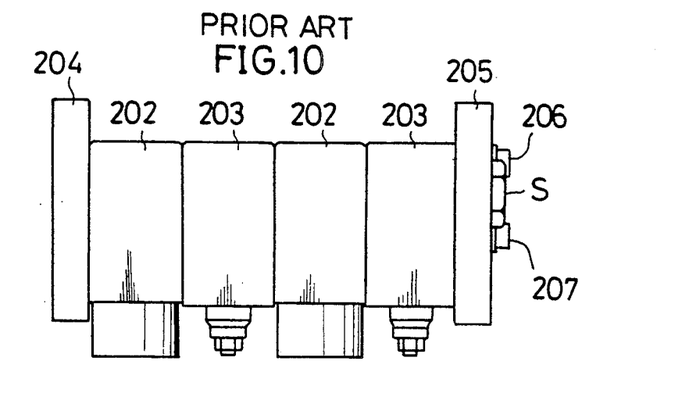
FIG. 10 shows a variant and is a view corresponding to FIG. 5.

By the way, as shown in FIG. 10, in the case that a multiplicate three way valve assembly is constructed by arranging a plurality of three way valves 202 and pressure compensating valves 203 side by side in the left and right direction, since the length in the left and right direction becomes longer, the aforementioned problems appear as a remarkable evil.

SUMMARY OF THE INVENTION

It is an object of the present invention to decrease an installation plan area for a three way valve assembly.

It is another object of the present invention to improve a flow characteristic of a three way valve.

It is still another object of the present invention to enable a necessary strength of an assembly bolt to be decreased.

It is a further object of the present invention to prevent an oil leakage between the contact surfaces of both housings.

It is a still further object of the present invention to facilitate a work for additionally installing a pressure compensating valve.

For accomplishing the aforementioned objects, the present invention is intended to make a construction for mounting the three way valve and the pressure compensating valve between both the end plates as follows.

The left and the right end plates are kept in contact with the left and the right end surfaces of the first housing of the three way valve, and the first housing is fixedly secured between these end plates by means of the assembly bolts. The second housing of the pressure compensating valve is kept in contact with any one of the upper, the lower, the front and the back end surfaces of the first housing. The second housing is fixedly secured to the first housing by a fixing means.

Incidentally, the end surface of the first housing with which the second housing is kept in contact may be the lower, the front, or the back end surface besides the upper end surface thereof. Further, the work port A may be opened in the back, the upper, the lower, the left or the right end surface of the first housing besides the front end surface thereof.

According to the present invention, the following advantages can be provided.

(a) An installation plane area for the three way valve becomes smaller.

Since the three way valve assembly becomes shorter in length in the left and right direction by the portion corresponding to the installation space of the pressure compensating valve omitted from the lateral side of the three way valve, the installation plane area at the time of assembly becomes smaller.

(b) A flow characteristic of the three way valve is improved.

Since also the pressure discharge port and the return port of the three way valve can be direct intercommunicated while the pressure supply port and the pressure port of the three way valve are direct intercommunicated, the respective passage resistances of the three way valve both on the pressure supply side and on the pressure discharge side can be small and the flow characteristic thereof can be improved.

(c) A necessary strength of the assembly bolt can be made smaller.

Since two O-rings (122) (123) employed in the aforementioned prior art (refer to FIG. 9) can be omitted, the assembly bolts can have smaller necessary strength due to a practical oil pressure reduced correspondingly by that omitted portion.

(d) An oil leakage between the contact surfaces of the housing can be prevented.

Since the assembly bolts can be manufactured shorter in length by the portion corresponding to the installation space of the pressure compensating valve omitted from the lateral side of the three way valve, an elongation at the time of pressure supply can be small. Therefore, an oil leakage can be prevented from being caused by a squeeze out of sealing members between the contact surfaces of the first housing and the left and the right end plates.

(e) It is easy to additionally install the pressure compensating valve.

In the case that the three way valve assembly with the pressure compensating valve is constructed by newly assembling the pressure compensating valve to the ready-installed three way valve, since it is not necessary to additionally bore the second housing to provide the bolt holes for the assembly bolts, it is easy to carry out the work for adding the pressure compensating valve.

Figure 5:
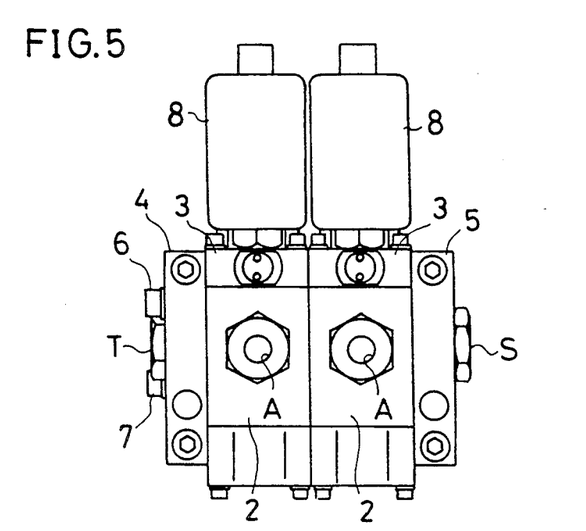
FIG. 5 shows a first variant and is a view corresponding to FIG. 1.

Incidentally, as shown in FIG. 5, in the case that the multiplicate three way valve assembly is constructed by arranging a plurality of three way valves and pressure compensating valves side by side in the left and right direction, since the length thereof can be made much shorter in comparison with that in the prior art as shown in FIG. 10, the aforementioned advantages can be further increased.

Further, since the pressure compensating valve can be readily dismounted from the first housing of the three way valve at the time of maintenance without removal of the assembly bolts, the maintenance can be readily performed.

BRIEF DESCRIPTION OF THE DRAWINGS

FIGS. 1 through 8 show embodiments of the present invention;

FIGS. 1 through 4 show one embodiment;

FIGS. 5 through 8 show variants respectively;

FIGS. 9 and 10 show conventional embodiments;

DESCRIPTION OF THE PREFERRED EMBODIMENTS

Now, one embodiment of the present invention will be explained with reference to FIGS. 1 through 4 hereinafter.

Firstly, an entire construction of a three way valve assembly with a pressure compensating valve will be explained.

Figure 1:
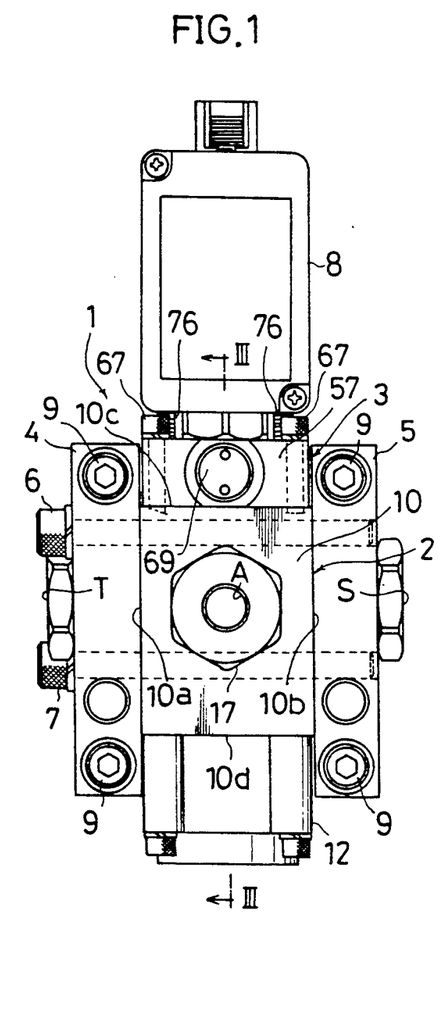
FIG. 1 is an elevation view of a three way valve assembly with a pressure compensating valve.
Figure 2:
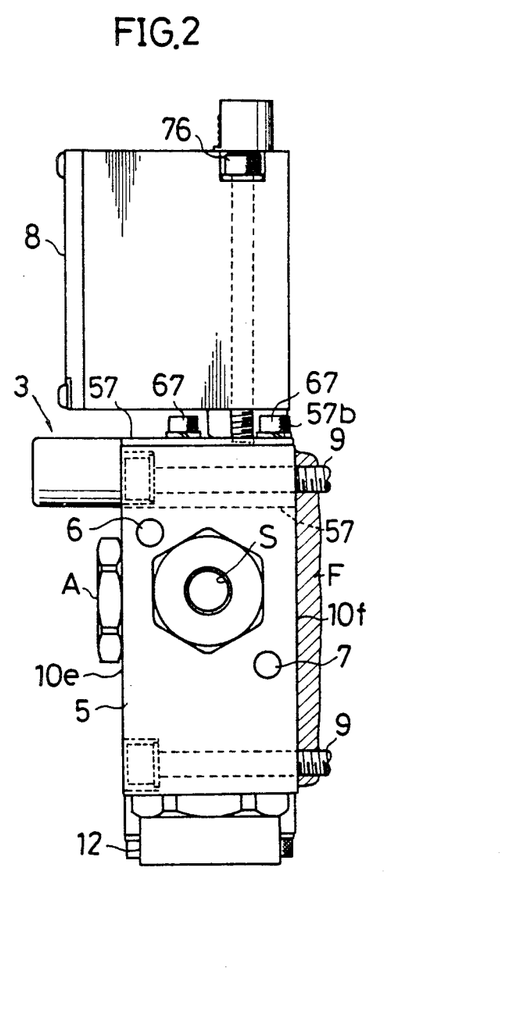
FIG. 2 is a right side view thereof.

As shown in an elevation view of FIG. 1 and in a right side view of FIG. 2, a pressure compensating valve 3 is fixedly secured to the upper surface of a three way valve 2, and both these valves 2, 3 are disposed between left and right paired end plates 4, 5. Both the end plates 4, 5 are fixedly tightened to the three way valve 2 by means of two, upper and lower assembly bolts 6, 7 from left and right sides toward central side. A pressure switch 8 is fixedly secured to the upper surface of the pressure compensating valve 3. The end plates 4, 5 are supported by a stationary table F by means of four attaching bolts 9.

Figure 3:
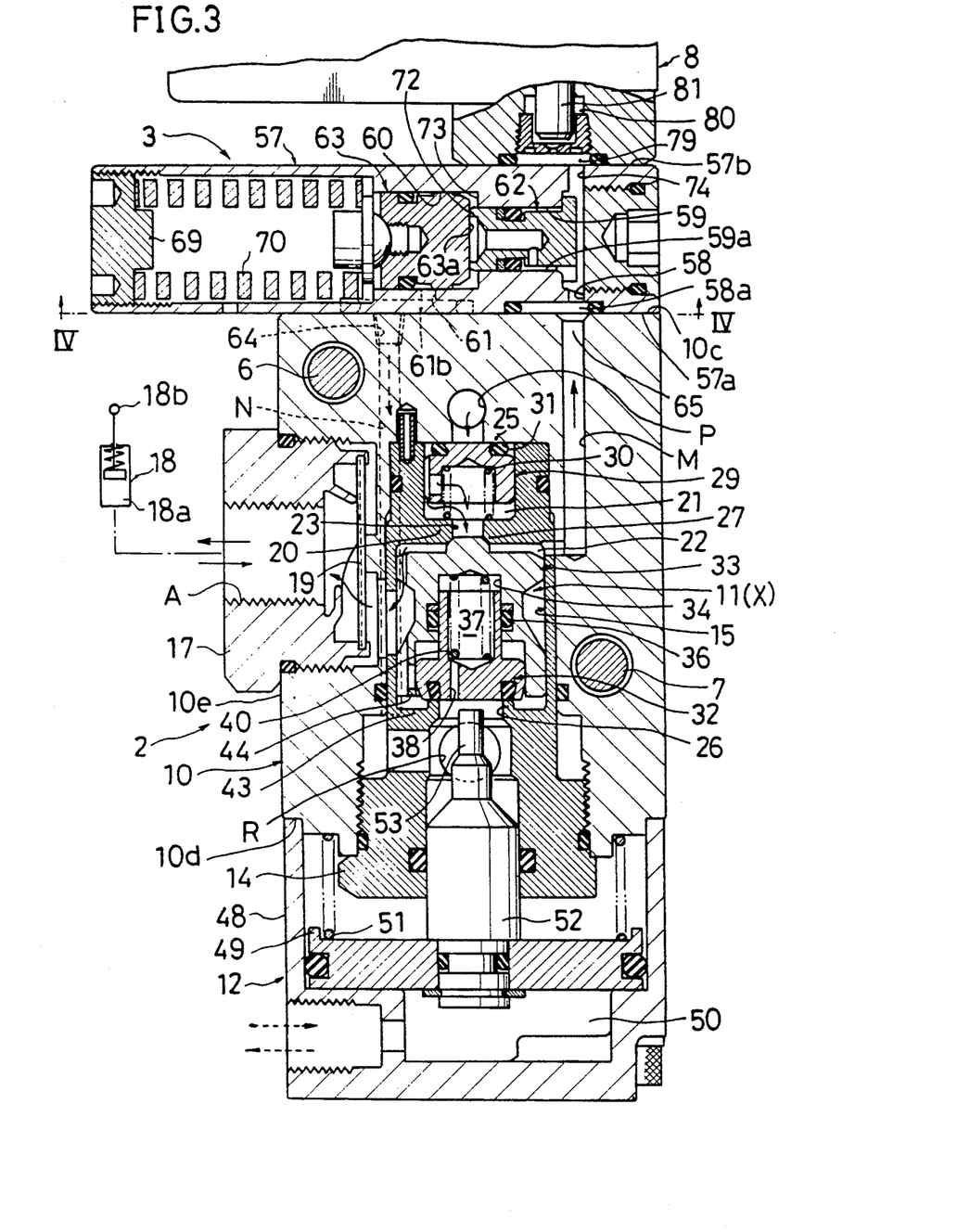
FIG. 3 is a sectional view taken along the III—III directed line in FIG. 1.

First of all, a construction of the three way valve 2 will be explained mainly with reference to FIG. 3. This is adapted to change over a sheet valve type directional changeover valve member 11 mounted within a first housing 10, by means of a directional changeover manipulation means 12.

A valve cover 14 is fixedly secured to the lower portion of a square rod-like first housing 10 in an oil-tight manner by means of threads, and a valve chamber 15 is vertically formed within both the first housing 10 and the valve cover 14. A pressure port P is opened in the upper portion of the valve chamber 15. The pressure port P is opened in the right end surface 10b of the first housing 10 and is communicated to a pressure supply port S of the right end plate 5. This pressure supply port S is connected in communication to a delivery port of a hydraulic pump (not illustrated). A return port R is opened in the lower portion of the valve chamber 15. This return port R is opened in the left end surface 10a of the housing 10, and is communicated to a pressure discharge port T of the left end plate 4. This pressure discharge port T is connected in communication to an oil tank (not illustrated). Further, a work port A is opened in the surrounding wall of the valve chamber 15. This work port A is connected in communication to an actuating oil chamber 18a of a single acting spring return type hydraulic cylinder 18 through a mouthpiece 17 mounted at the front end surface 10e of the first housing 10. A filter 19 is mounted within the mouthpiece 17. Incidentally, the symbol 10f designates a back end surface of the first housing 10.

The aforementioned valve chamber 15 is vertically partitioned into a first chamber 21 and a second chamber 22 by an intermediate partition wall 20, and these first and second chamber 21, 22 are intercommunicated through a communication port 23. A pressure supply valve seat 25 is formed in the first chamber 21 on the side of the pressure supply port P. A return valve seat 26 is formed in the second chamber 22 on the side of the return port R. Further, a short circuit prevention valve seat 27 is formed in the external periphery of the communication port 23 within the second chamber 22.

The directional changeover valve member 11 is provided with a check valve member 29 inserted into the first chamber 21 and both a return valve member 32 and a short circuit prevention valve member 33 inserted into the second chamber in order from below. The check valve member 29 is resiliently urged onto the pressure supply valve seat 25 by means of a check valve member closing spring 30. A valve surface of the check valve member 29 is composed of a rubber elastic sealing member 31. The return valve member 32 is vertically oil-tightly inserted into a fitting hole 34 bored in the lower surface of the short circuit prevention valve member 33, through an O-ring 36. Thereby, a received pressure removing chamber 37 is formed between both the valve members 32, 33 in such a manner as being partitioned from the second chamber 22. This received pressure removing chamber 37 has its cross-sectional area formed smaller than the opening cross-sectional area of the return valve seat 26 and is communicated to the return port R through a communication port 38 within the return valve member 32. By means of a return valve member closing spring 40 mounted between both the valve member 32, 33, the return valve member 32 is resiliently urged onto the return valve seat 26 as well as the short circuit prevention valve member 33 is resiliently urged onto the short circuit prevention valve seat 27. A stopper portion 43 for limiting a downward valve opening movement of the short circuit prevention valve member 33 is formed in the lower side wall of the interior walls of the second chamber 22. A stopped portion 44 is downward projected from the short circuit prevention valve member 33 opposite to the stopper portion 43.

The aforementioned directional changeover manipulation means 12 is disposed outside the lower portion of the valve chamber 15 and is of a pneumatic-actuation single-acting spring-return type. That is, a piston 49 is vertically slidably and air-tightly inserted into a pneumatic cylinder 48 fixedly secured to the lower end surface 10d of the first housing 10. A pneumatic actuation chamber 50 is formed below the piston 49, and a return spring 51 is installed above the piston 49. A valve opening member 53 for the return valve member 32 is formed in the upper portion of a piston rod 52 projected from the upper surface of the piston 49, and the valve opening member 53 is opposed to the return valve member 32 from the side of the return port R.

The aforementioned three way valve 2 operates as follows.

Under the no-load condition wherein an oil pressure is not applied to both the ports P, A as well as a pressurized air is discharged from the pneumatic actuation chamber 50 of the directional changeover manipulation means 12, the check valve member 29 is closed by means of a resilient force of the check valve member closing spring 30 as well as the return valve member 32 and the short circuit prevention valve member 33 are closed by means of a resilient force of the return valve member closing spring 40.

When the hydraulic cylinder 18 is operated for extension, a pressurized oil is supplied from the hydraulic pump (not illustrated) to the pressure port P through the pressure supply port S. Thereupon, firstly the check valve member 29 is opened against the valve closing spring 30 by means of an oil pressure at the pressure port P to increase a pressure within the first chamber 21. Then, the short circuit prevention valve member 33 is opened against the return valve member closing spring 40 by means of the oil pressure within the first chamber 21. Thereby, the pressurized oil is supplied from the pressure port P to the work port A to extend the hydraulic cylinder 18. Under the changed over condition wherein the directional changeover valve member 11 is changed over to the pressure supply position X in that way, the return valve member 32 is brought into contact with the return valve seat 26 for valve closing by means of a resultant force of the resilient force of the return valve member closing spring 40 and the inner pressure of the second chamber 22. The inner pressure of the second chamber 22 acts on a valve closing pressure receiving area as an annular area obtained by extracting a cross-sectional area of the received pressure removing chamber 37 from the opening cross-sectional area of the return valve seat 26, so that a downward valve closing force is imposed onto the return valve member 32. After once the short circuit prevention valve member 33 has been opened, since a downward received pressure is imposed onto the short circuit prevention valve member 33 by the inner pressure of the second chamber 22, it is maintained in the valve opened state. A valve opening movement of the short circuit prevention valve member 33 is limited to a predetermined distance because the stopped portion 44 is adapted to be received by means of the stopper portion 43.

Under the pressure supply condition, as the hydraulic cylinder 18 extends, a load imposed on its output portion 18b increases, so that the pressures within the actuation oil chamber 18a and the work port A increase. Accompanied therewith, the pressures within the second chamber 22 and the first chamber 21 increase. When those pressures become substantially equal to a pressure in the pressure port P, the check valve member 29 is automatically brought into contact with the pressure supply valve seat 25 for valve closing by means of the resilient force of the check valve member closing spring 30. Thereby, even though a little pressure leak is caused on the side of the pressure port P, a lowering of the inner pressure of the valve chamber 15 is prevented to provide the pressure holding condition.

On one hand, when contracting the hydraulic cylinder 18, a pressurized air is supplied to the pneumatic actuation chamber 50 of the directional changeover manipulation means 12 so that the piston 49 is upward driven against the resilient force of the return spring 51. Thereupon, the return valve member 32 is pushed and opened by means of a valve opening member 53, and the pressurized oils within the work port A and the second chamber 22 are discharged to the return port R as well as the valve opening member 53 brings the short circuit prevention valve member 33 into contact with the short circuit prevention valve seat 27 through the return valve member 32. Thereby, the pressurized oil within the pressure port P is prevented from leaking from the first chamber 21 into the second chamber 22.

By the way, after the hydraulic cylinder 18 has completed its contraction, when the pressurized air is discharged from the pneumatic actuation chamber 50 of the directional changeover manipulation means 12, the valve opening member 53 is downward retreated through the piston 49 and the piston rod 52 and changed over to the pressure supply condition.

In the aforementioned pressure compensating valve 3, a lower end surface 57a as a basic end surface of its second housing 57 is fixedly secured to the upper end surface 10c of the first housing 10 by means of a fixing means 67 composed of four bolts as shown in FIGS. 1 and 2. The construction of the pressure compensating valve 3 will be explained with reference to FIGS. 3 and 4 hereinafter.

Figure 4:
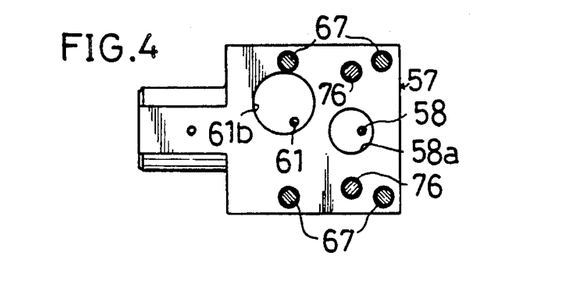
FIG. 4 is a sectional view taken along the IV—IV directed line in FIG. 3.

A pressure discharge outlet port 61 is communicated to a pressure inlet port 58 through a throttling valve chamber 59 and a relief valve chamber 60 in order within the second housing 57, and a throttling valve member 62 is inserted into the throttling valve chamber 59 as well as a relief valve member 63 is inserted into the relief valve chamber 60.

The throttling valve member 62 is internally fitted into the throttling valve chamber 59 so as to be slidable in the left and right direction, and a throttling passage 59a is formed by a gap for sliding between the throttling valve member 62 and the internal surrounding surface of the throttling valve chamber 59. A relief valve seat 72 formed at the left end surface of the throttling valve member 62 is capable of advancing and retreating relative to the relief valve chamber 60. A receiving surface 73 for the relief valve member 63 is formed at the right end surface of the relief valve chamber 60.

When a relief pressure adjusting nut 69 is manipulated for such adjustment, the relief valve member 63 is adapted to be pushed toward the throttling valve chamber 59 on the right side by means of the resilient force of the a relief pressure setting spring 70 so that the valve surface 63a can be brought into contact with the relief valve seat 72 for valve closing.

The pressure inlet port 58 is communicated to the work port A through an abnormal pressure relief port M of the three way valve 2 and the valve chamber 15. The pressure discharge outlet port 61 is communicated to the return port R through an abnormal pressure return port N of the three way valve 2. A starting end portion 64 of the abnormal pressure return port N and an ending end portion 65 of the abnormal pressure relief port M are opened in the upper end surface 10c of the first housing 10. A starting end portion 58a of the pressure inlet port 58 of the pressure compensating valve 3 is communicated to the ending end portion 65 of the abnormal pressure relief port M, and an ending end portion 61b of the pressure discharge outlet port 61 of the pressure compensating valve 3 is communicated to the starting end portion 64 of the abnormal pressure return port N.

The aforementioned pressure compensating valve 3 operates as follows.

Under the low pressure condition wherein the oil pressure of the pressure inlet port 58 is not more than a predetermined pressure, the relief valve seat 72 is retreated outside the right side of the relief valve chamber 60 by means of a resilient force of a relief pressure setting spring 70 through the valve surface 63a of the relief valve member 63, so that the throttling valve member 62 is pushed and returned to the right side as well as the relief valve member 63 is received by means of the receiving surface 73.

Under the high pressure condition wherein the oil pressure of the pressure inlet port 58 is not less than the predetermined pressure, the throttling valve member 62 is pushed to the left side by means of the high oil pressure, so that the relief valve seat 72 is brought into contact with the valve surface 63a of the relief valve member 63 for valve closing as well as the relief valve seat 72 is entered into the relief valve chamber 60 against the resilient force of the relief pressure setting spring 70.

Under the aforementioned high pressure condition, when the oil pressure of the pressure inlet port 58 is increased at a very slow speed by a thermal expansion and so on, the valve surface 63a of the relief valve member 63 is separated from the relief valve seat 72 to the left side by means of the oil pressure, so that the pressurized oil of the pressure inlet port 58 is discharged from the pressure discharge outlet port 61 to the return port R through the throttling passage 59a and the relief valve chamber 60 in order. Thereby, the inner pressures within the valve chamber 15 of the three way valve 2 and within the actuating oil chamber 18a of the hydraulic cylinder 18 are prevented from being abnormally increased.

As shown in FIGS. 1 and 2, the aforementioned pressure switch 8 is fixedly secured to the upper end surface 57b of the second housing 57 of the pressure compensating valve 3 by means of a fixing means 76 composed of two bolts. As shown in FIG. 3, a pressure extraction port 74 communicated to the pressure inlet port 58 within the second housing 57 and a pressure introduction port 79 of the pressure switch 8 are intercommunicated between the contact surfaces of upper end surface 57b of the second housing 57 and of the pressure switch 8. A pressure receiving rod 81 is inserted into a pressure receiving chamber 80 communicated to the pressure introduction port 79 so that the pressure receiving rod 81 can actuate a microswitch (not illustrated).

In the above construction, the number of the assembly bolt employed for the left and the right end plates 4, 5 may be not less than three or may be one. The upper end surface 10c of the first housing 10 of the three way valve 2 may be located above the upper end surfaces of the left and the right end plates 4, 5. Further, the pressure supply port S and the pressure discharge port T may be provided in only one of the left and the right end plates 4, 5.

FIGS. 5 through 8 show variants respectively. In each variant, a component having the same construction as that in the above embodiment is designated by the same symbol.

(First Variant)

FIG. 5 shows a first variant.

In this variant, two sets of three way valves 2 and pressure compensating valves 3 are arranged on the left side and on the right side between the left and right end plates 4, 5. Incidentally, there may be provided not less than three sets of both valves 2, 3.

(Second Variant)

Figure 6:
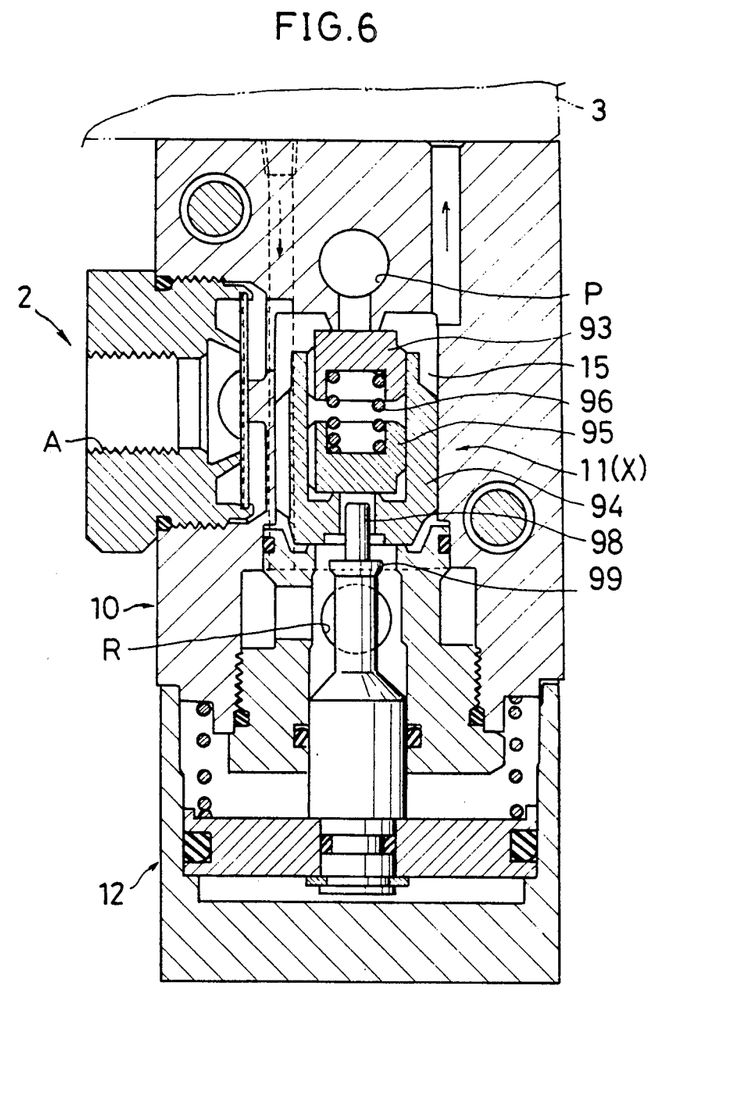
FIG. 6 shows a second variant and is a view corresponding to FIG. 3.

FIG. 6 shows a second variant, which modifies the three way valve 2 as follows.

The directional changeover valve member 11 within the valve chamber 15 is provided with a pressure valve member 93 disposed within the pressure port P and a return valve member 94 disposed within the return port R. The pressure valve member 93 and a pressure relief valve member 95 are internally fitted into the return valve member 94, and a valve closing spring 96 is interposed between both these valve members 93, 95. A pressure relief valve opening member 98 and a return valve opening member 99 are arranged in the directional changeover manipulation means 12 in order from above so as to be opposed to the pressure relief valve member 95 and the return valve member 94 respectively. Firstly, after the pressure within the valve chamber 15 has been relieved by opening the pressure relief valve member 95, the return valve member 94 is adapted to be opened.

(Third Variant)

Figure 7:
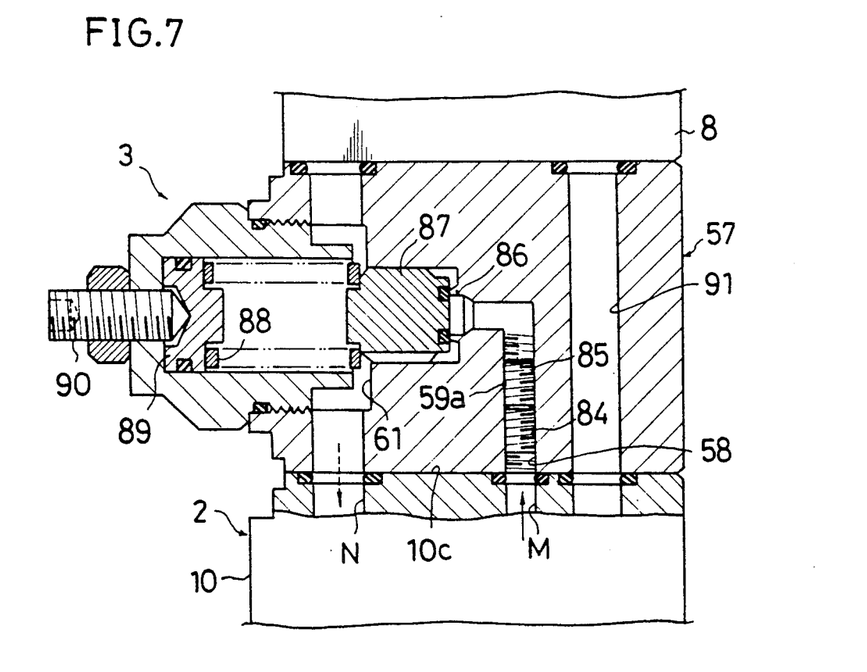
FIG. 7 shows a third variant and is a vertical sectional view of a pressure compensating valve.

FIG. 7 shows a third variant, which has the pressure compensating valve 3 modified as follows.

Within the second housing 57, throttling small screws 84, 85 are threadably engaged with the pressure inlet port 58 so that the throttling passage 59a is constructed by the fitting gap. A relief valve member 87 is brought into contact with a relief valve seat 86 fixedly secured to the second housing 57 for valve closing, by means of a relief pressure setting spring 88. A resilient force of this setting spring 88 is adapted to be adjusted by means of an adjusting bolt 90 through a piston 89. By the way, a pressure extraction port 91 to the pressure switch 8 is formed at a different location from that of the pressure inlet port 58, within the second housing 57.

(Fourth Variant)

Figure 8:
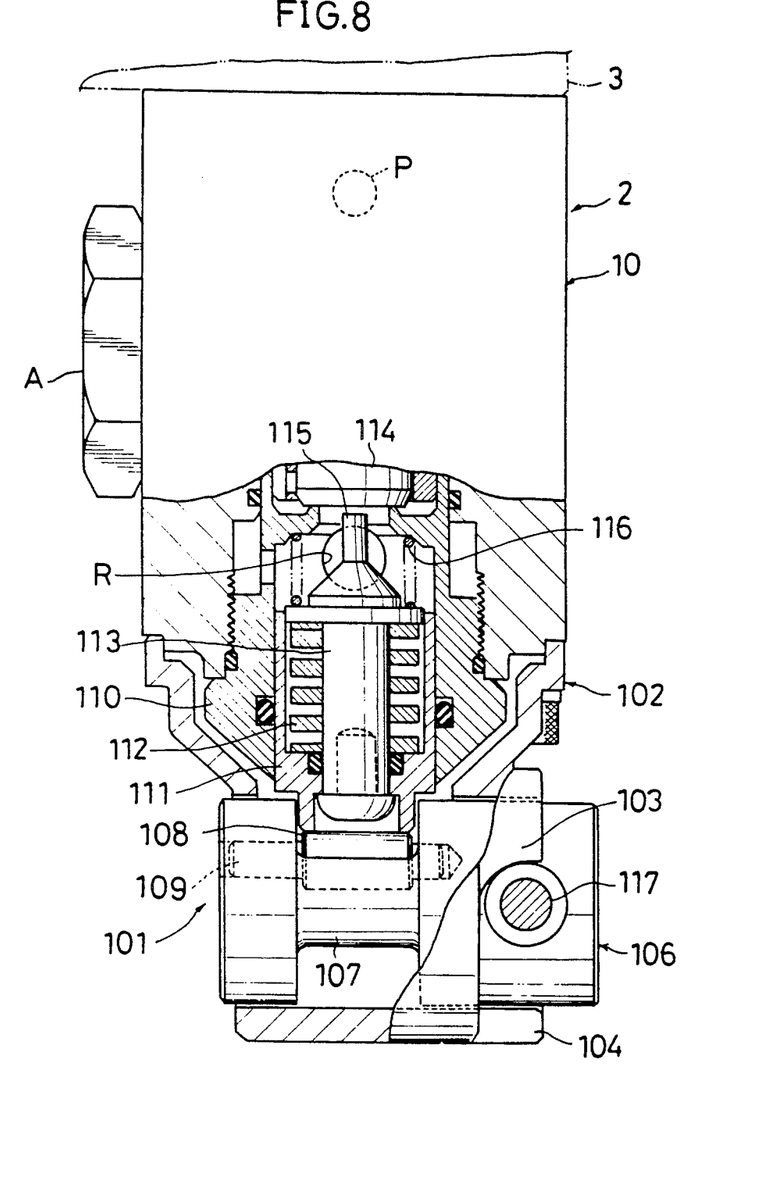
FIG. 8 shows a fourth variant and is a view corresponding to FIG. 3.

FIG. 8 shows a fourth variant.

In this variant, a directional changeover manipulation means 101 of the three way valve 2 is of a manually actuating type and is constructed as follows.

A pivot shaft 106 is rotatably supported by the lower portion of a bracket 102 fixedly secured to the first housing 10. A central portion of the pivot shaft 106 in the left and right direction is reduced in diameter, and a pusher roller 108 is supported by means of a pin 109 at an eccentric position outside the reduced diameter portion 107. On one hand, a pusher tube 111 is inserted into a valve cover 110 so as to be opposed to the pusher roller 108. A valve opening manipulation rod 113 is resiliently upward urged by means of a pushing spring 112 within the tubular bore of the pusher tube 111. A valve opening member 115 for the return valve member 114 is provided in the upper portion of that rod 113, and the rod 113 is resiliently downward urged by means of a return spring 116.

This directional changeover manipulation means 101 operates as follows.

As illustrated, under the changed over condition to the upward pivoted state wherein a fixing manipulation lever 117 is received by means of an upper stopper 103 of the bracket 102 at the right position of the pivot shaft 106, the pusher roller 108 is located on the lower side, and both the rod 113 and the pusher tube 111 are retreated to the lower side by means of the return spring 116.

When being changed over to the downward pivoted state wherein the manipulation lever 117 is downward swung so as to be received by means of the lower stopper 104 of the bracket 102, the pivot shaft 106 is turned and the pusher roller 108 is moved to the upper position so as to upward advance the rod 113 through the pusher tube 111 and the pushing spring 112 in order and to open the return valve 114.

As many different embodiments of the invention will be obvious to those skilled in the art, some of which have been disclosed or referred to herein, it is to be understood that the specific embodiments of the invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. In a three way valve assembly with a pressure compensating valve, which valve assembly including left and right end plates (4)(5) having a pressure supply port (S) and a pressure discharge port (T),
   - a three way valve (2) having a first housing (10) provided with a work port (A), said work port (A) being adapted to be selectively communicated to said pressure supply port (S) and to said pressure discharge port (T),
   - a pressure compensating valve (3) having a second housing (57) and adapted to release a pressure abnormally raised at a very slow speed within said work port (A) to said pressure discharge port (T),
   - said first housing (10) having left and right end surfaces (10a)(10b), upper and lower end surfaces (10c)(10d) and front and back end surfaces (10e)(10f) and disposed between said left and right end plates (4)(5), and
   - at least one assembly bolt (6)(7) serving to tighten said end plates (4)(5) from the left and right sides to the central side, the improvement comprising:
   - said left and right end plates (4)(5) being brought into contact with the left and right end surfaces (10a)(10b) of said first housing (10),
   - said second housing (57) being brought into contact with one end surface (10c) of the upper, lower, front and back end surfaces (10c)(10d)(10e)(10f) of said first housing (10), and
   - a fixing means (67) serving to fix said second housing (57) to said first housing (10).

2. A valve assembly as defined in claim 1, wherein said first housing (10) is provided with an abnormal pressure relief port (M) communicated to said work port (A) and an abnormal pressure return port (N) communicated to said pressure discharge port (T),
   - said second housing (57) is provided with a pressure inlet port (58) and a pressure discharge outlet port (61),
   - between the contact surfaces of both said housing (10)(57), said abnormal pressure relief port (M) and said pressure inlet port (58) are intercommunicated as well as said abnormal pressure return port (N) and said pressure discharge outlet port (61) are intercommunicated.

3. A valve assembly as defined in claim 2, wherein said second housing (57) is fixedly secured to the upper end surface (10c) of said first housing (10),
   - said work port (A) is opened in the front end surface (10e) of said first housing (10), and
   - a directional changeover manipulation means (12) of the three way valve (2) is fixedly secured to the lower end surface (10d) of said first housing (10).

4. A valve assembly as defined in claim 3, wherein a throttling valve member (62), a relief valve member (63) and a relief pressure setting spring (70) which compose said pressure compensating valve (3) are arranged within said second housing (57) in order from back side.

5. A valve assembly as defined in claim 2, wherein a pressure switch (8) is kept in contact with an external end surface (57b) opposite to a basic end surface (57a) on the side of said three way valve (2), of external end surfaces of said second housing (57), and said pressure switch (8) is fixedly secured to said external end surface (57b) by means of another fixing means (76), and
   - between the contact surfaces of the external end surface (57b) of said second housing (57) and said pressure switch (8), a pressure introduction port (79) of said pressure switch (8) is opened.

6. A valve assembly as defined in claim 4, wherein said pressure supply port (S) is provided in one end plate (5) of the left and right end plates (4)(5), and said pressure discharge port (T) is provided in the other end plate (4).

* * * * *